(12) United States Patent
Lee (10) Patent No.: US 8,615,850 B2
(45) Date of Patent: Dec. 31, 2013

(54) WINDOW ADJUSTMENT CORD SAFETY CONNECTOR

(76) Inventor: Han-Sen Lee, Chang-Hwa Hsien (TW)

(*) Notice: Subject to any disclaimer, the term of this patent is extended or adjusted under 35 U.S.C. 154(b) by 213 days.

(21) Appl. No.: 13/092,973

(22) Filed: Apr. 24, 2011

(65) Prior Publication Data

US 2012/0266416 A1    Oct. 25, 2012

(51) Int. Cl.
*F16G 11/10* (2006.01)
*E06B 9/30* (2006.01)

(52) U.S. Cl.
USPC .................. 24/115 F; 160/178.1 R (58) Field of Classification Search
None
See application file for complete search history.

(56) References Cited

U.S. PATENT DOCUMENTS

| 5,562,140 A * | 10/1996 | Biba ................ 160/178.1 R |
| 7,587,794 B2 * | 9/2009 | Lin ........................ 24/115 F |
| 8,132,299 B2 * | 3/2012 | Zhang ................... 24/115 F |

* cited by examiner

*Primary Examiner* — Jack W. Lavinder
(74) *Attorney, Agent, or Firm* — Curtis L. Harrington; Harrington & Harrington (57) ABSTRACT

A window covering cord collection and coordination device of the invention involves two halves of an assembly which acts as an enclosure for collection of upper control lines, and as an attachment for a downwardly extending single actuation line which may be optionally employed. A key projection member fits within a complementary key slot member at a first or upper end of the window covering cord collection and coordination device and which is oriented and designed to disengage upon any significant downward separating force acting upon the series of upper controlled lines which the window covering cord collection and coordination device engages through an upper slot which enables upper controlled lines to exert a separating force against the first and second housing sections which make up the window covering cord collection and coordination device.

13 Claims, 5 Drawing Sheets

WINDOW ADJUSTMENT CORD SAFETY CONNECTOR

FIELD OF THE INVENTION

The present invention relates to a device which is effective in providing a window covering cord collection and coordination device which will break open should any object become caught and produce a downward separating force against the window covering cord collection and coordination device to prevent any structure or member from being vertically suspended in the window covering cords so collected and coordinated.

BACKGROUND OF THE INVENTION

Window covering cord collection and coordination devices are structures which capture a plurality of control cords so that the plurality of captured control cords can be operably and evenly pulled down or allowed to go up simultaneously. For example, the horizontal slat may have four lift lines which need to be actuated simultaneously to enable the bottom of the window covering and collected slats to be lifted evenly. This was traditionally done by placement of a joining structure which operated much like a knot in all of the lifting cords to insure that they were pulled together.

These joining structures effectively formed a short termination as an effective loop. Any object placed between any two coordinated cords can only pass downward, especially under the influence of gravity, as far as the connector and its formed loop. This arrangement can cause tripping, hanging, strangulation and cut off circulation. Where the window covering is solidly attached, an entanglement can last for a long time. Where the window covering is not well attached, the window covering can become dislodged and cause significant damage.

Normal operation of the window covering cord collection and coordination devices involves introduction of force from one end regardless of the raising force or the lowering force. However, the forces which are transmitted in working against a loop work against the window covering cord collection and coordination device. The window covering cord collection and coordination devices must be able to break any formed loop when downward pressure is applied from above, but always handle the tensile force from a cord below the Window covering cord collection and coordination device.

The design of a window covering cord collection and coordination device which is so well constructed that it does not allow disengagement of the formed loop will continue to pose the same danger of earlier clips, knots and other dangerous loop forming devices. Conversely, a window covering cord collection and coordination devices which breaks apart too easily with any uneven force of the upper control lines or with a significant force in the underlying control line will cause the user to have to continually re-assemble the released window covering cord collection and coordination device. Continual break open and freeing of upper lines will cause a lot of undue effort and aggravation, and will lead to a user's attempt to circumvent a safety cord collection and coordination devices and thus defeat the very purpose for such a safety devices' introduction. The needed safety device must work properly and balance both needs or it is effectively useless.

SUMMARY OF THE INVENTION

The structures and process for operation of the window covering cord collection and coordination device of the invention involves two halves of an assembly which acts as an enclosure for collection of upper control lines, and as an attachment for a downwardly extending single actuation line which may be optionally employed. A key projection member fits within a complementary key slot member at a first or upper end of the window covering cord collection and coordination device and which is oriented and designed to disengage upon any significant downward separating force acting upon the series of upper controlled lines which the window covering cord collection and coordination device engages through an upper slot which enables upper controlled lines to exert a separating force against the first and second housing sections which make up the window covering cord collection and coordination device. The shape and degree of complementary fit of the key projection member and generally complementary key slot member will determine the force necessary to break the first and second housing members apart and free the series of upper controlled lines.

One or more knot engagement structures are located below the mid point of the window covering cord collection and coordination device to insure that the point at which the series of upper controlled lines is secured is spaced apart from the area where the series of upper controlled lines leave the window covering cord collection and coordination device. Any downward separating force acting upon the upper slot from which the series of upper controlled lines can be clearly exerted upon the opposite halves of the first and second housing members and without such force being mitigated by entanglement, twisting and the like.

A lower aperture in the window covering cord collection and coordination device from which an optional single control line can be extended and where other handles can be placed includes a force stabilization plank to balance the downward forces evenly on both halves of the device. The plank is ideally integrally formed with one half of the window covering cord collection and coordination device and with the other free end resting upon a section of a small floor on the other half of the housing of the device.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

The description and operation of the window covering cord collection and coordination device of the invention will begun to be best described with reference to FIG. 1 which illustrates an expanded perspective view of a window covering cord collection and coordination device 21 having a first housing section 23 and a second housing section 25. The housing sections 23 and 25 that make up the device 21 share complementary halves of a upper slot 29 through which a series of upper controlled lines 31, 33, 35, and 37 are seen extending upwards. In a usual case, the controlled lines 31, 33, 35, and 37 need to be allowed to travel upwardly and pulled downwardly simultaneously.

Below the window covering cord collection and coordination device 21 a single control line 41 is seen extending downwardly. The single control line 41 is optional as the body of the window covering cord collection and coordination device 21 can itself be grasped and pulled manually. The single control line 41 gives advantage where one of the resting positions of the window covering cord collection and coordination device 21 is high enough to effectively be out of reach. Typically the upper controlled lines 31, 33, 35, and 37 feed into a header rail before being separately routed to different locations in the header rail. Its preferable for the window covering cord collection and coordination device 21 to be mounted high in a position where the window coverings (not seen) are at their lowest position and also significantly high when the window coverings (not seen) are at their highest or raised position, so that the window covering cord collection and coordination device 21 is kept completely away from the floor, but this is not always possible.

Window coverings in the home are of shorter length and may be located closer to the floor. As a result, any cross connection device will be located closer to the floor. Closeness of cross connection of the upper controlled lines 31, 33, 35, and 37 to the floor, increases the chance that children, pets, and objects may be inadvertently caught on the cross connection device and pulled. If caught on an adult, the window covering (not shown) could be pulled down. A child or a pet could become entangled and result in entanglement, choking or circulation damage. It is when the window coverings are raised that the cross connect for the upper controlled lines 31, 33, 35, and 37 would normally be the lowest to the floor.

The window covering cord collection and coordination device 21 is long enough that any force which causes separation of the upper controlled lines 31, 33, 35, and 37 and downward force on the window covering cord collection and coordination device 21 will put a directed force against the opposite ends of the upper slot 29, regardless of which of the three available paths between the upper controlled lines 31, 33, 35, and 37 the object and its downward force travels along. A separation 45 is seen between the first housing section 23 and second housing section 25. The separation is generally linear along the main length of the first housing section 23 and second housing section 25. However along a top, generally flattened portion 49 of the separation 45 deviates into an interlock shape to one side of the upper slot 29 and in which a key projection member 51 is formed continuous with the second housing section 25 and in which a complementary key slot member 53 is formed continuous with the first housing section 23. The force required to dislodge the key projection member 51 from the complementary key slot member 53 is low for objects traveling toward the window covering cord collection and coordination device 21 along the series of upper controlled lines 31, 33, 35, and 37. When dislodgement of the key projection member 51 from the complementary key slot member 53 occurs, the first housing section 23 separates from the second housing section 25.

Figure 1:
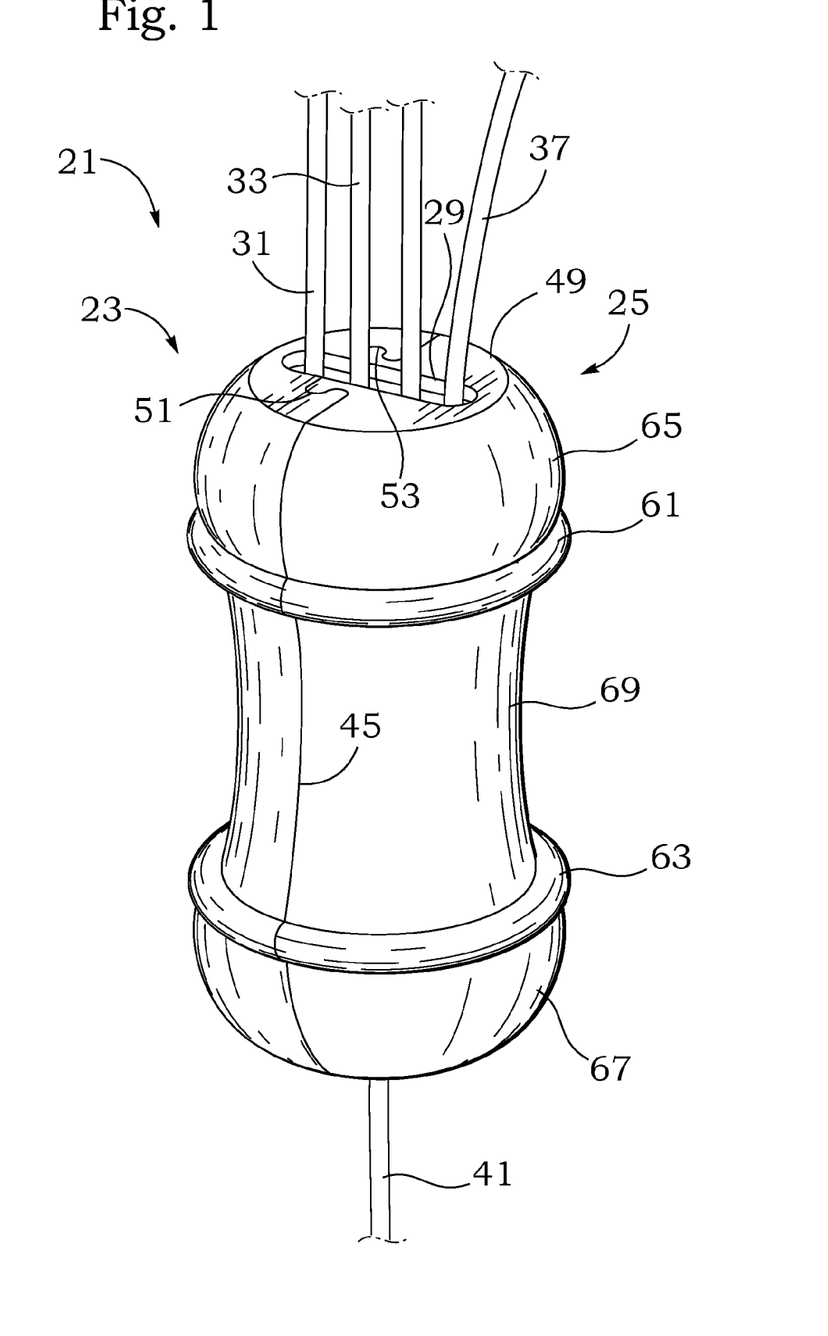
FIG. 1 illustrates a perspective assembled view of the window covering cord collection and coordination device of the invention and illustrating upper controlled lines and a lower extending actuation line.

FIG. 1 illustrates other features of the window covering cord collection and coordination device 21 including an upper rib 61 and a lower rib 63 carried on the first and second housing sections 23 and 25. The first and second housing sections 23 and 25 include an upper rounded portion 65 above the upper rib 61 and a lower rounded portion 67 below the lower rib 63. Between the upper and lower ribs 61 and 67, an inwardly curving central portion 69 is seen.

Figure 2:
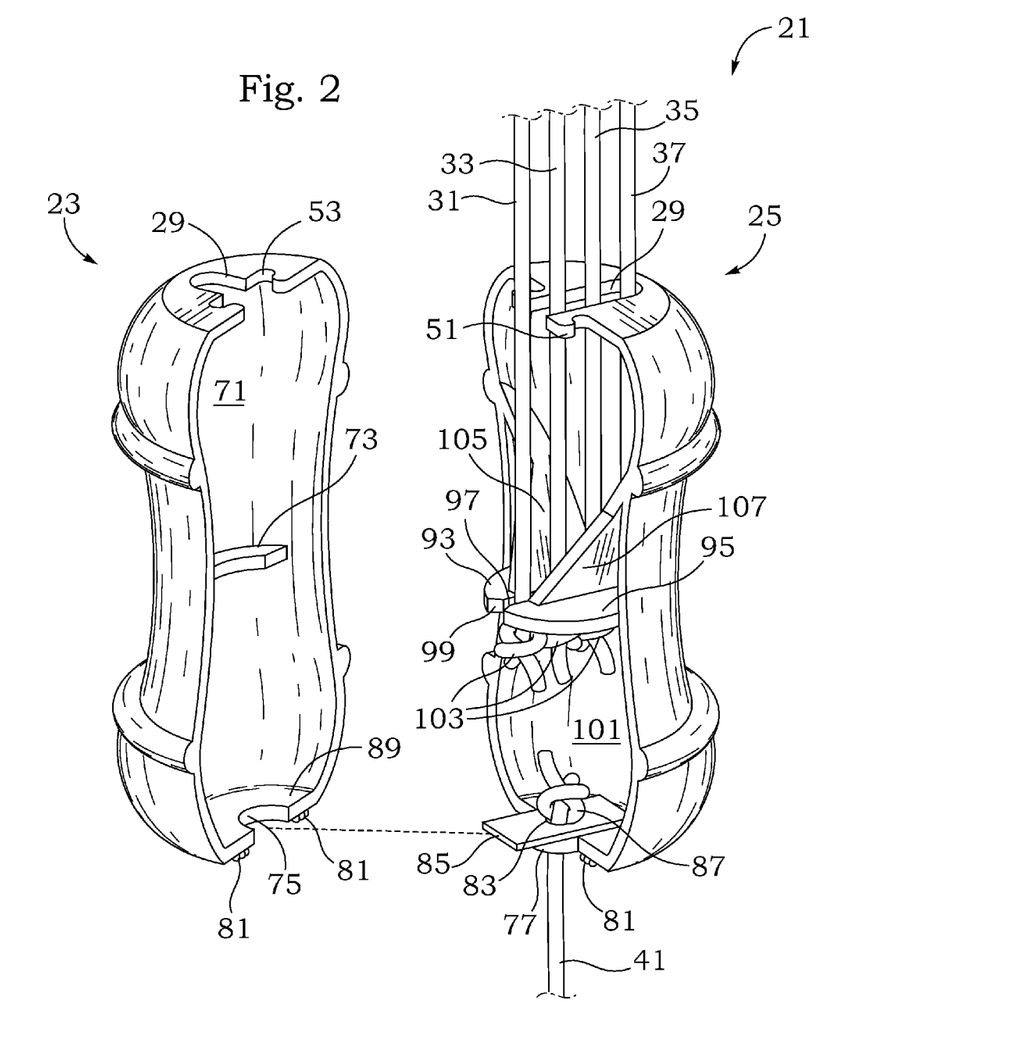
FIG. 2 illustrates an exploded view of the window covering cord collection and coordination device seen in FIG. 1 into first and second housing portions with controlled cords shown as continuing to be seen in position for purposes of illustration.

Referring to FIG. 2, a partially exploded view of the window covering cord collection and coordination device 21 of FIG. 1 is shown with the first housing section 23 separated from the second housing section 25 with both being slightly turned to reveal internal structures. The first housing section 23 details can be seen more clearly, and in particular the relationship between the upper slot 29 and the complementary key slot member 53.

First housing section 23 has an internal wall side 71 from which a reinforcing shelf 73 arises. The reinforcing shelf 73 is preferably formed integrally with the material of the first housing section 23 and its operation will be discussed later. At the inside base of the first housing section 23 a circular slot 75 which is configured to accept an aperture ear 77 which is partially seen on the second housing section 25.

Seen at the bottom of both the first housing section 23 and second housing section 25 is a pair of spaced apart hinge connectors 81 which show a sectional face which is illustrative of the material of device 21 being preferably continuous with the sectional face of an opposite one of the pair of spaced apart hinge connectors 81. In this configuration, the window covering cord collection and coordination device 21 will have been preferably molded as a single piece joined by two slight pathways of material making up the pair of spaced apart hinge connectors 81. When removed from the mold and folded together, alignment of the first housing section 23 and second housing section 25 occurs to form the overall structure of the window covering cord collection and coordination device 21 seen in FIG. 1. The series of upper controlled lines 31, 33, 35, and 37 and single control line 41 can be added before or after the first housing section 23 and second housing section 25 are brought together as the window covering cord collection and coordination device 21 is intended to be opened and closed many times and still operate.

However, the window covering cord collection and coordination device 21 can operate quite well without the pair of spaced apart hinge connectors 81, with the only difference being that when the window covering cord collection and coordination device 21 breaks open to release the series of upper controlled lines 31, 33, 35, and 37, that the device 21 falls to the ground in two pieces instead of one. If the pair of spaced apart hinge connectors 81 are in tact the device will fall to the ground in one piece. The device 21 can be re-closed to secure the series of upper controlled lines 31, 33, 35, and 37 with or without the presence of the pair of spaced apart hinge connectors 81.

The single control line 41 extends through an aperture 83 which extends through both aperture ear 77 and a force stabilization plank 85. Stabilization plank 85 is a structure which reinforces the force exerted downwardly by a knot 87 formed in single control line 41 as it acts with downward force against the window covering cord collection and coordination device 21. Downward force on the stabilization plank 85 is shared on both first housing section 23 second housing section 25. Stabilization plank 85 is preferably formed integrally with second housing section 25. The first housing section 23 includes a small floor 89 adjacent the circular slot 75 and which supports the extending end of the stabilization plank 85 when the first housing section 23 and second housing section 25 are joined to form the unitary structure seen in FIG. 1 as window covering cord collection and coordination device 21.

Just below the vertical middle of second housing section 25 is a circular projection having a centered lateral separation opening. In detail can be seen a first knot engagement structure 93 opposite a second knot engagement structure 95. Knot engagement structures 93 and 95 have a circular extent to form a complementary fit with the inside of the first housing portion 23, but could be of a different shape. A separation gap 97 exists between the first and second knot engagement structures 93 and 95. At the farthest extent of the separation gap 97, a pair of oppositely positioned angled openings 99 help to position and insert any of the series of upper controlled lines 31, 33, 35, and 37 which may be loaded into the separation gap 97. Further, the separation gap 97 need not be linear and can be of any shape. Separation gap 97 may be sized with respect to the effective diameters of the upper controlled lines 31, 33, 35, and 37, meaning that if their density were low and their compressibility were high, the upper controlled lines 31, 33, 35, and 37 could fit through a narrower opening and could be maintained within an overall length narrower separation gap 97. This means that window covering cord collection and coordination device 21 can be made of different overall sizes with different sized internals to be able to effectively handle different upper controlled lines 31, 33, 35, and 37. Further, reinforcing shelf 73 fits over the farthest extent of the first and second knot engagement structures 93 and 95 in the vicinity of the pair of oppositely positioned angled openings 99.

The separation gap 97 may run across to an inside wall 101 of the second housing section 25. The series of upper controlled lines 31, 33, 35, and 37 are shown as having knots 103 (only three are visible in FIG. 2). The knots 103 are large enough that the lower ends of the series of upper controlled lines 31, 33, 35, and 37 shown below the knots cannot pass through the separation gap 97. Thus any downward pull on the window covering cord collection and coordination device 21 will securely and even pull downward on the controlled lines 31, 33, 35, and 37 secured by the first and second knot engagement structures 93 and 95 and their engagement onto the knots 103.

As can be seen, when the window covering cord collection and coordination device 21 is open, that the controlled lines 31, 33, 35, and 37 can sequentially escape through the separation gap 97 of the pair of oppositely disposed first and second knot engagement structures 93 and 95. Further, note the existence of a pair of angled supports, including a first angled support 105 connected between the inside wall 101 and the first knot engagement structure 93, and a second angled support 107 connected between the inside wall 101 and the first and second knot engagement structures 93 and 95. The first and second angled supports 105 and 107 help to brace the first and second first and second knot engagement structures 93 and 95 against the second housing section 25. As is also seen, any upward force on the first and second first and second knot engagement structures 93 and 95 is also transmitted to the first housing section 23 via engagement with the reinforcing shelf 73 of the first housing section 23.

As a further result, when the a single control line 41 is pulled downward, the downward force of the knot 87 onto the force stabilization plank 85 creates a downward pulling force with respect to the second housing section 25 to which the force stabilization plank 85 is connected or integrally formed, and also to the first housing section 23 by means of the bearing of the farthest end section of the force stabilization plank 85 onto the small floor 89. As a result, the upward force exerted on the window covering cord collection and coordination device 21 by the series of upper controlled lines 31, 33, 35, and 37, and the downward force exerted by the single control line 41 are well distributed throughout the first and second housing sections 23 and 25.

Note that the underside of the first and second first and second knot engagement structures 93 and 95 is below the midpoint of the overall length of the first and second housing sections 23 and 25. A moment is introduced with respect to a pivot at level of the first and second first and second knot engagement structures 93 and 95 by the series of upper controlled lines 31, 33, 35, and 37 directly at the opposite ends of the upper slot 29. If the first and second first and second knot engagement structures 93 and 95 were at or only slightly below the upper slot 29, the upper controlled lines 31, 33, 35, and 37 might have to be less advantageously pulled directly laterally apart and with a much greater force to put sufficient force on the opposite ends of the upper slot 29.

Under tension, the upper controlled lines 31, 33, 35, and 37 act with some leverage against the ends of the upper slot 29 rather than conventional connectors which may support any upper lines so closely to the end of a conventional connector that their very engagement structures can interfere with their exerting a breaking force.

Conversely with respect to the window covering cord collection and coordination device 21, the support for the series of upper controlled lines 31, 33, 35, and 37 is so far within the depth of the length of the first and second housing sections 23 and 25 that a downward movement of an object between any of the upper controlled lines 31, 33, 35, and 37 exert a significant force on the upper slot 29 to cause the window covering cord collection and coordination device 21 first and second housing sections 23 and 25 to break apart. Once the first and second housing sections 23 and 25 are broken apart, the upper controlled lines 31, 33, 35, and 37 will easily become dislodged from the separation gap 97 and no object between any of the upper controlled lines 31, 33, 35, and 37 will be caught.

In addition, the point of downward pull of the single control line 41 against the force stabilization plank 85 is closer to the first and second knot engagement structures 93 and 95 than the first and second first and second knot engagement structures 93 and 95 and separation gap 97 is to the top end of the window covering cord collection and coordination device 21. Downward force from the single control line 41 acts to orient the window covering cord collection and coordination device 21 and provides no pulling directly against the top of the window covering cord collection and coordination device 21 which would tend to cause first and second housing sections 23 and 25 to break apart. In fact, the orientation of the first and second knot engagement structures 93 and 95 with their first and second angled supports 105 and 107 causes the first and second knot engagement structures 93 and 95 to close even more tightly about the series of upper controlled lines 31, 33, 35, and 37 as the knots 103 exert their force against the underside of the first and second knot engagement structures 93 and 95. Since these forces are isolated in the lower half of the window covering cord collection and coordination device 21, they cannot be inadvertently transmitted to the key projection member 51 and complementary key slot member 53 to cause an inadvertent separation of the first and second housing sections 23 and 25.

Other features of the window covering cord collection and coordination device 21 are seen in FIG. 2. The series of upper controlled lines 31, 33, 35, and 37 are organized and fit linearly within the separation gap 97. Organization also means that the upper controlled lines 31, 33, 35, and 37 are fed into the separation gap 97 and will leave the separation gap 97 in generally the same order that they were fed or placed. As can also be seen, the first and second angled supports 105 and 107 will guide any string toward the outlet of the separation gap 97, even if one of the upper controlled lines 31, 33, 35, and 37 starts to folds downward.

Even without the use of a single control line 41, the window covering cord collection and coordination device 21 provides a coordination device for the series of upper controlled lines 31, 33, 35, and 37 in providing both their organization and a housing which is attractive and easy to grasp. More importantly, and less able to be shown pictorially, the window covering cord collection and coordination device 21 provides a structure which will not inadvertently come apart under the most severe pulling, but will easily come apart in response to any force applied through the upper controlled lines 31, 33, 35, and 37.

Figure 4:
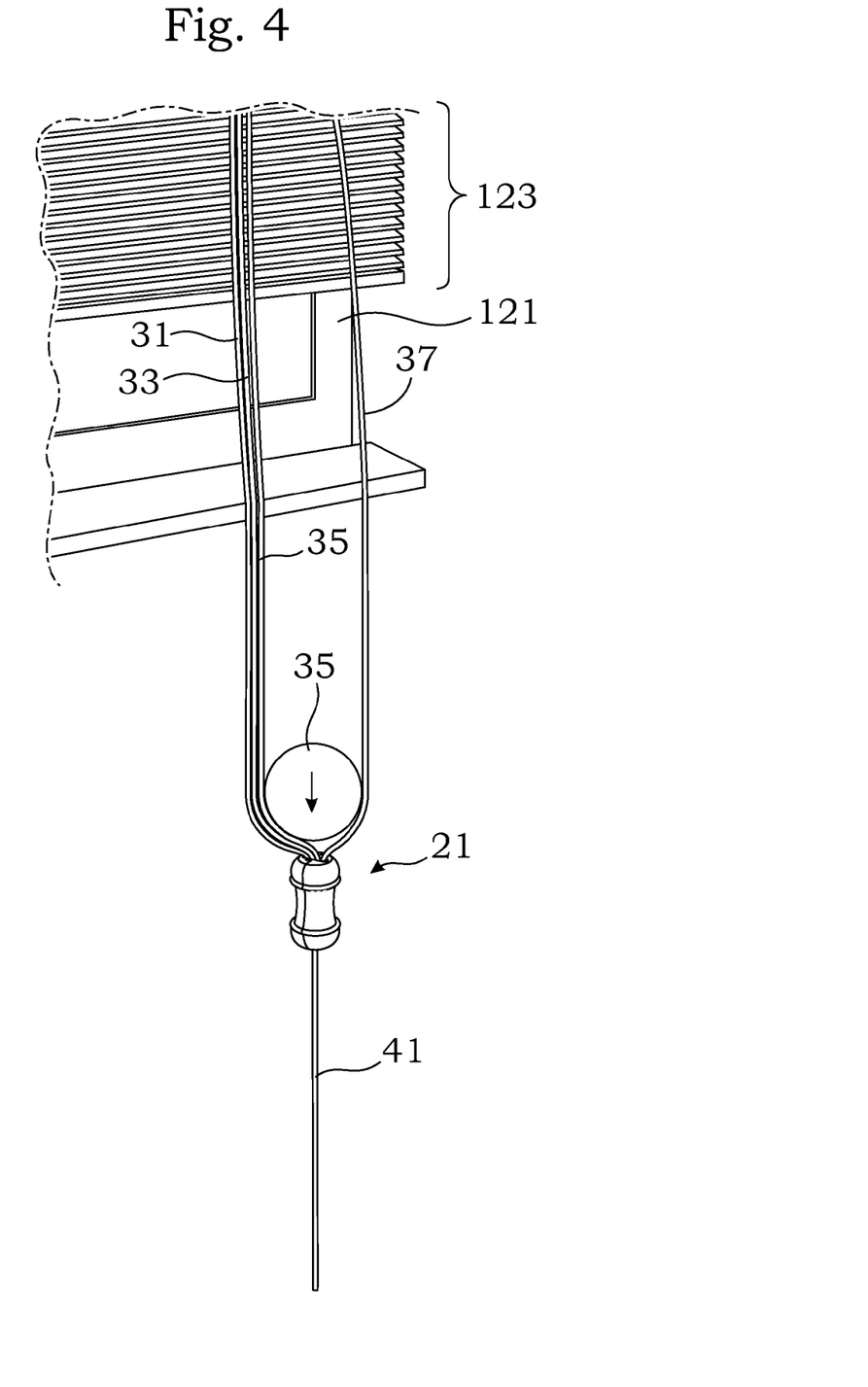
FIG. 4 illustrates a window and window covering with an example of an object moving downward between any of a number of upper controlled lines with the object shown as it has moved down, approached and moved near to the window covering cord collection and coordination device of the invention and before separation into first and second housing sections.

Referring to FIG. 4, a broken apart condition is illustrated and in which the series of upper controlled lines 31, 33, 35, and 37 are shown in an alignment orientation but removed from the separation gap 97. Dashed guide lines show the method and placement of loading the upper controlled lines 31, 33, 35, and 37 back into the separation gap 97. The single control line 41 is shown in a position to be threaded through the aperture 83 which extends through both aperture ear 77 and a force stabilization plank 85. After the controlled lines 31, 33, 35, and 37 are loaded into the separation gap 97 and the single control line 41 is re-attached with respect to the second housing section 25, the first and second housing sections 23 and 25 are ready to be aligned and re-closed. If the pair of spaced apart hinge connectors 81 are still attached and operable, the pivoting of the first housing section 23 with respect to the second housing section 25 will cause the reinforcing shelf 73 to rest over the most projecting extent of the first and second knot engagement structures 93 and 95, and the most projecting extent of the force stabilization plank 85 will be extended over the small floor 89 adjacent the circular slot 75 to provide a distributed sectional stability. The aperture ear 77 is moved into place within the circular slot 75, and finally, the key projection member 51 approaches and begins to fit within the complementary key slot member 53. Pressure is applied to finally cause the key projection member to snap engage the complementary key slot member 53, at which point the window covering cord collection and coordination device 21 is fully assembled and ready to function.

Figure 3:
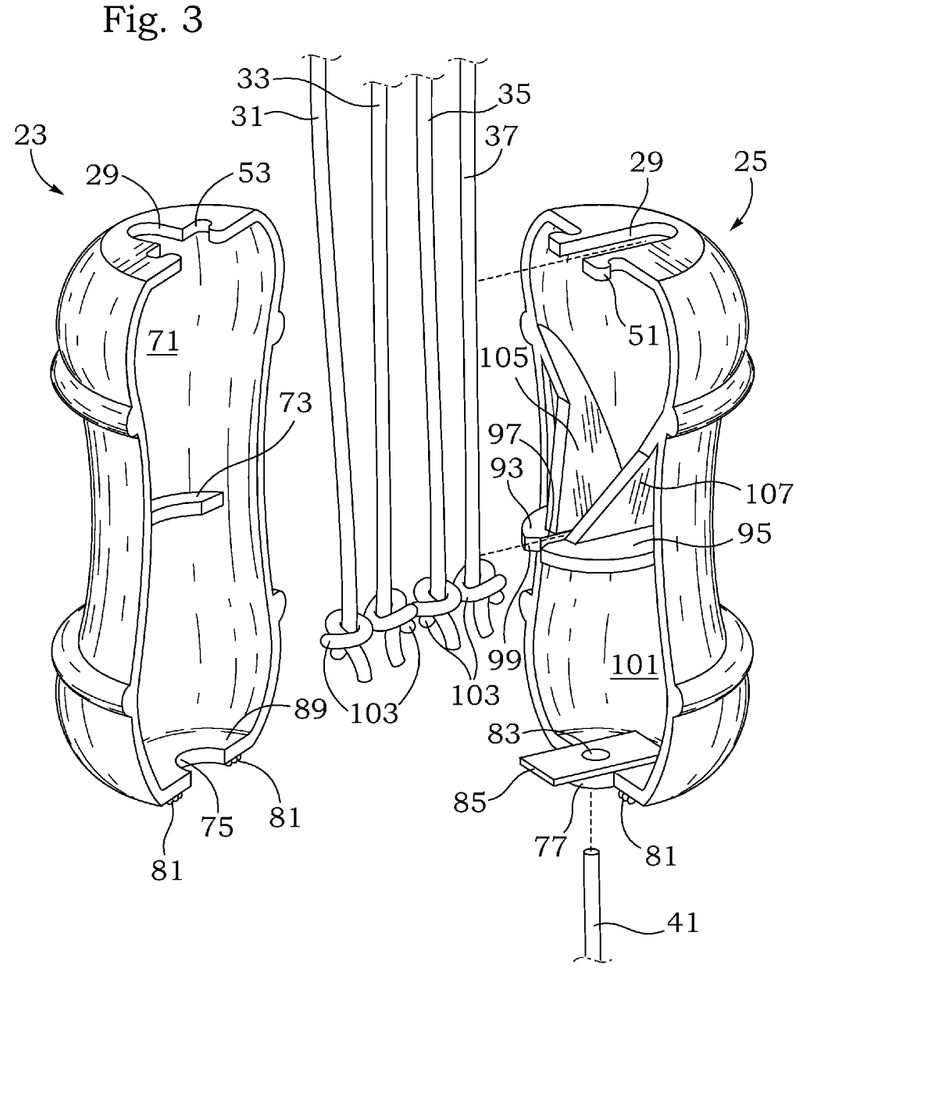
FIG. 3 illustrates a view as seen in FIG. 2, but with the series of upper controlled lines removed from a separation gap between two projections on one housing portion which are complementary with the other housing portion and with a lower single control line shown untied and removed from a lower aperture for purposes of illustration.
Figure 5:
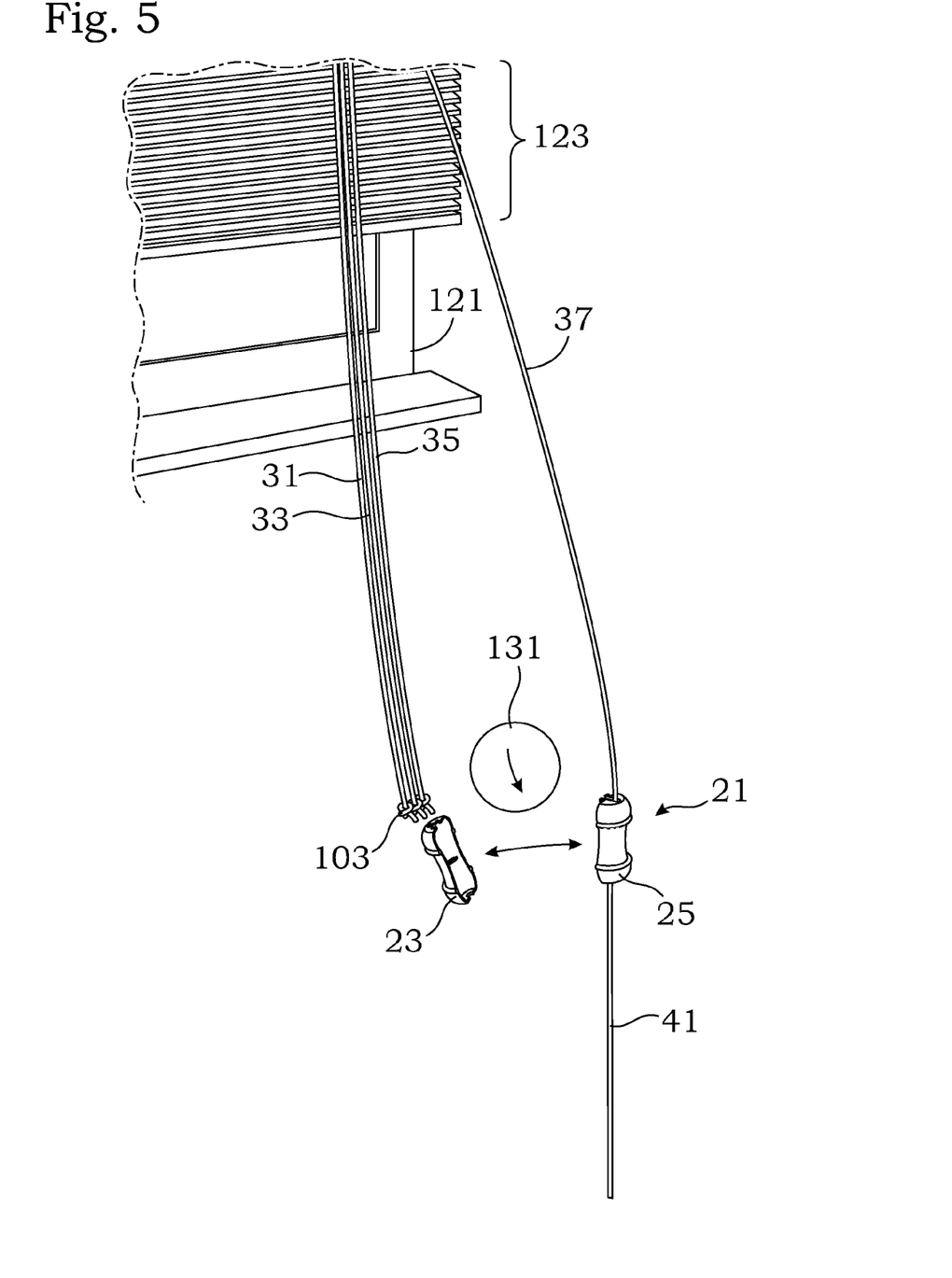
FIG. 5 is a view similar to that seen in FIG. 4 but in which the object has continued downward movement to cause the separation of the window covering cord collection and coordination device into separated into first and second housing sections which has caused the freeing of the upper controlled lines to prevent the object from being caught or entangled.

Referring to FIG. 5, a typical window covering configuration including a window 121 having a window covering 123 having the series of upper controlled lines 31, 33, 35, and 37 structure connected into a top of a window covering cord collection and coordination device 21. A lower, single control line 41 is also seen. An object 131 is shown as having interposed itself between the series of upper controlled lines 31, 33, 35, and the control line 37. In reality, the object 131 could have been interposed between any two of the series of upper controlled lines 31, 33, 35, and 37, even if they are out of serial order. This is due to the fact because the holding structure is deeply enough within the window covering cord collection and coordination device 21, any crossing pattern of lines will still produce an opening force at the upper slot 29 that was seen in FIGS. 1-3.

Object 131 can be a cross section of an arm, a head, a neck, a stick, a ball, an irregularly shaped object, a hook, or in short, any sort of structure which can fit in between any combination of the series of upper controlled lines 31, 33, 35, and 37. If the object 131 begins to move downward toward the window covering cord collection and coordination device 21, the series of upper controlled lines 31, 33, 35, and 37 begin to be separated just above the upper slot 29. The action of some subset of the series of upper controlled lines 31, 33, 35, and 37 being separated and the presence of the upper slot 29 will cause the window covering cord collection and coordination device 21 to become oriented so that the separation begins bearing against the terminal extremes of the upper slot 29.

Further movement of the object 131 toward the window covering cord collection and coordination device 21 with even slight force will cause the window covering cord collection and coordination device 21 to break into separated first and second housing sections 23 and 25 which further enable the upper controlled lines 31, 33, 35, and 37 to be rapidly separated from the separation gap 97 and prevent any continuing hazard or trap for the object 131. FIG. 4 show movement of the object 131 to a position close to the window covering cord collection and coordination device 21 and just before separation into first and second housing sections 23 and 25.

Referring to FIG. 5, a view similar to that in FIG. 4 is seen but in which the window covering cord collection and coordination device 21 has broken into separated first and second housing sections 23 and 25. Three of the upper controlled lines 31, 33, & 35 are shown as separated from the second housing section 25 although there may be little to hold the controlled line within the second housing section 25. As can be seen, the object 131 is completely free of any restraint and is freed.

The force with which the window covering cord collection and coordination device 21 will break open into separated first and second housing sections 23 and 25 will depend upon the size and shape of the key projection member 51 with respect to the complementary key slot member 53, as well as the degree of complementarity of key projection member 51 and complementary key slot member 53.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A window covering cord collection and coordination device comprising:
    a first housing section;
    a second housing section complementary to and registrable with respect to the first housing section to form said window covering cord collection and coordination device, said window covering cord collection and coordination device having an upper control line upper slot shared between said first and said second housing sections at a first end of said window covering cord collection and coordination device and opposite a second end of said window covering cord collection and coordination device, said second housing section having a separation gap adjacent a first knot engagement structure that is attached to said second housing section and which may be used to hold a knot of an upper control cord, and wherein said first and said second housing sections configured to separate completely from one another and from any upper control cords upon pressure against the first housing section with respect to the second housing section at the upper control line upper slot.

2. The window covering cord collection and coordination device as recited in claim 1 wherein said first knot engagement structure is closer to said second end of said window covering cord collection and coordination device than to said first end of said window covering cord collection and coordination device.

3. The window covering cord collection and coordination device as recited in claim 1 and further comprising a second knot engagement structure on an other side of the separation gap and opposite said first knot engagement structure and oriented that said first and said second knot engagement structures may be used to more securely hold a knot of an upper control cord to secure said upper control cord to said window covering cord collection and coordination device.

4. The window covering cord collection and coordination device as recited in claim 3 wherein first and said second knot engagement structures include a pair of oppositely positioned angled openings to said separation gap to facilitate cord collection and coordination of upper control lines into said separation gap.

5. The window covering cord collection and coordination device as recited in claim 1 wherein said first and second knot engagement structures are closer to said second end of said window covering cord collection and coordination device than to said first end of said window covering cord collection and coordination device.

6. The window covering cord collection and coordination device as recited in claim 1 and further comprising a first angled support attached to said first knot engagement structure and extending from said first knot engagement structure and toward said first end of said window covering cord collection and coordination device and attached to said second housing section, and a second angled support attached to said second knot engagement structure and extending from said second knot engagement structure and toward said first end of said window covering cord collection and coordination device and attached to said second housing section, said first and second angled supports for strengthening said first and second knot engagement structures respectively with respect to said second housing section.

7. The window covering cord collection and coordination device as recited in claim 1 and wherein said first and second knot engagement structures extend across to said first housing section and are reinforced by said first housing section.

8. The window covering cord collection and coordination device as recited in claim 1 wherein said first housing section is joined to said second housing section at said second end of said window covering cord collection and coordination device.

9. The window covering cord collection and coordination device as recited in claim 1 wherein said first housing section includes a key projection member and wherein said second housing section carries a complementary key slot member into which said key projection member can selectably lockably interfit to stabilize said first and second housing sections into said window covering cord collection and coordination device.

10. The window covering cord collection and coordination device as recited in claim 1 wherein said upper control line upper slot is continuous with said key projection member and said complementary key slot member.

11. The window covering cord collection and coordination device as recited in claim 1 and further comprising a force stabilization plank integral with said first housing section and extending into said second housing section and adjacent said second end of said window covering cord collection and coordination device.

12. A window covering cord collection and coordination device comprising:
a first housing section;
a second housing section complementary to and registrable with respect to the first housing section to form said window covering cord collection and coordination device, said window covering cord collection and coordination device having an upper control line upper slot shared between said first and said second housing sections at a first end of said window covering cord collection and coordination device and opposite a second end of said window covering cord collection and coordination device, said second housing section having a separation gap adjacent a first knot engagement structure that is attached to said second housing section and which may be used to hold a knot of an upper control cord, and wherein said first and second knot engagement structures are formed integrally with said second housing section.

13. A window covering cord collection and coordination device comprising:
a first housing section;
a second housing section complementary to and registrable with respect to the first housing section to form said window covering cord collection and coordination device, said window covering cord collection and coordination device having an upper control line upper slot shared between said first and said second housing sections at a first end of said window covering cord collection and coordination device and opposite a second end of said window covering cord collection and coordination device, said second housing section having a separation gap adjacent a first knot engagement structure that is attached to said second housing section and which may be used to hold a knot of an upper control cord, and wherein said first and second knot engagement structures extend across to said first housing section and are reinforced by said first housing section and, wherein said reinforcement by said first housing section includes a reinforcing shelf which partially overlies said first and second knot engagement structures when said first and said second housing sections are joined to form said window covering cord collection and coordination device.

* * * * *